US012792263B2

(12) United States Patent
Choi

(10) Patent No.: US 12,792,263 B2
(45) Date of Patent: Nov. 10, 2026

(54) STORAGE DEVICE SYNCHRONIZING INFORMATION ON TARGET ZONE AND METHOD FOR OPERATING STORAGE DEVICE

(71) Applicant: SK hynix Inc., Gyeonggi-do (KR)

(72) Inventor: Kyu Ho Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/413,043

(22) Filed: Jan. 16, 2024

(65) Prior Publication Data

US 2025/0085891 A1 Mar. 13, 2025

(30) Foreign Application Priority Data

Sep. 13, 2023 (KR) ........................ 10-2023-0121837

(51) Int. Cl.
*G06F 3/06* (2006.01)

(52) U.S. Cl.
CPC .......... *G06F 3/0658* (2013.01); *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS 11,379,304 B1 7/2022 Cadloni et al.
11,586,385 B1 * 2/2023 Lercari ............... G06F 12/0246
2018/0139650 A1 * 5/2018 Kwon ..................... H04L 69/04
2020/0118585 A1 * 4/2020 Gerhart ................. G06F 3/0659
2021/0056023 A1 * 2/2021 Jin ........................ G06F 3/0679
2021/0089217 A1 * 3/2021 Bjørling .............. G06F 11/2094
2021/0182166 A1 * 6/2021 Hahn .................. G06F 11/3034
2022/0035561 A1 * 2/2022 Ha ........................ G06F 3/0673
2022/0334760 A1 * 10/2022 Jang .................... G06F 11/1441
2022/0382668 A1 * 12/2022 Malisic ............... G06F 11/3688
2023/0236765 A1 * 7/2023 Son ....................... G06F 3/0619
711/154
2023/0236964 A1 * 7/2023 Kim .................... G06F 12/0891
711/170
2023/0297247 A1 * 9/2023 Kanno .................. G11C 16/10
711/154
2023/0325113 A1 * 10/2023 Hodes ................... G06F 3/0653
2023/0376217 A1 * 11/2023 Lee ....................... G06F 3/0673
2024/0070067 A1 * 2/2024 Choi ..................... G06F 3/0656
2024/0078027 A1 * 3/2024 Mun ..................... G06F 3/0631
2024/0143211 A1 * 5/2024 Na ........................ G06F 3/0644
2024/0160563 A1 * 5/2024 Kochar ............... G06F 12/0253
2024/0370196 A1 * 11/2024 Lee ....................... G06F 3/0607
2025/0077091 A1 * 3/2025 Park ...................... G06F 3/0679

FOREIGN PATENT DOCUMENTS

KR 10-2020-0120159 A 10/2020

* cited by examiner

*Primary Examiner* — Hosain T Alam
*Assistant Examiner* — Ryan Dare
(74) *Attorney, Agent, or Firm* — IP&T GROUP LLP

(57) ABSTRACT

A storage device may update, when executing a recovery operation for a sudden power-off, zone information for a target zone among a plurality of zones, and may transmit, after updating the zone information, an exception event alert message to a host. Further, the storage device may receive, after transmitting the exception event alert message, a command from the host, and may transmit updated zone information to the host as a response to the command.

14 Claims, 10 Drawing Sheets

10

STORAGE DEVICE SYNCHRONIZING INFORMATION ON TARGET ZONE AND METHOD FOR OPERATING STORAGE DEVICE

CROSS-REFERENCE TO RELATED APPLICATION

The present application claims priority under 35 U.S.C. § 119(a) to Korean Patent Application No. 10-2023-0121837 filed on Sep. 13, 2023, which is incorporated herein by reference in its entirety.

BACKGROUND

1. Technical Field

Various embodiments of the present disclosure generally relate to a storage device which synchronizes information on a target zone, and a method for operating a storage device.

2. Related Art

A storage device is a device which stores data on the basis of a request from an external device such as a computer, a mobile terminal such as a smartphone and a tablet, or various electronic devices.

The storage device may include a controller for controlling a memory (e.g., a volatile memory/a nonvolatile memory). The controller may receive a command from the external device, and may execute or control an operation for reading, writing or erasing data with respect to the memory included in the storage device, on the basis of the received command.

According to a request from the external device, the storage device may set a plurality of zones. The external device may manage the plurality of zones and may transmit a read request and a write request for the plurality of zones to the storage device.

SUMMARY

Various embodiments of the disclosed technology are directed to providing a storage device capable of preventing an issue in which zone information is inconsistent between a host and the storage device due to a sudden power-off, and a method for operating the same.

In addition, various embodiments of the disclosed technology are directed to providing a storage device which ensures reliability of a read operation and a write operation even after a sudden power-off, and a method for operating the same.

In an embodiment of the present disclosure, a storage device may include: a memory including a plurality of memory units, each of the plurality of memory units being mapped to one of a plurality of zones which are managed by a host; and a controller configured to update, when executing a recovery operation for a sudden power-off, zone information for a target zone among the plurality of zones, transmit, after updating the zone information, an exception event alert message to the host, receive, after transmitting the exception event alert message, a command from the host, and transmit updated zone information to the host as a response to the command.

In an embodiment of the present disclosure, a method for operating a storage device may include: updating, when executing a recovery operation for a sudden power-off, zone information for a target zone among a plurality of zones; transmitting, after updating the zone information, an exception event alert message to a host which manages the plurality of zones; receiving, after transmitting the exception event alert message, a command from the host; and transmitting updated zone information to the host as a response to the command.

In an embodiment of the present disclosure, a system may include: a host configured to manage a plurality of zones; and a storage device including a plurality of memory units, each of the plurality of memory units being mapped to one of the plurality of zones. The storage device may update, when executing a recovery operation for a sudden power-off, zone information for a target zone among the plurality of zones, transmit, after updating the zone information, an exception event alert message to the host, receive, after transmitting the exception event alert message, a command from the host, and transmit updated zone information to the host in response to the command.

In an embodiment of the present disclosure, a storage device may include: a memory including memory units each mapped to one of a plurality of zones; and a controller configured to report, to a host, that information on an open zone of the plurality of zones has been updated and provide the host with the information. The controller may provide the information in response to a command from the host. The controller may further configured to update the information during a recovery operation after a sudden power interrupt to the storage device.

According to the embodiments of the disclosed technology, it is possible to prevent an issue in which zone information is inconsistent between a host and a storage device due to a sudden power-off and to ensure reliability of a read operation and a write operation even after a sudden power-off.

DETAILED DESCRIPTION

Figure 1:
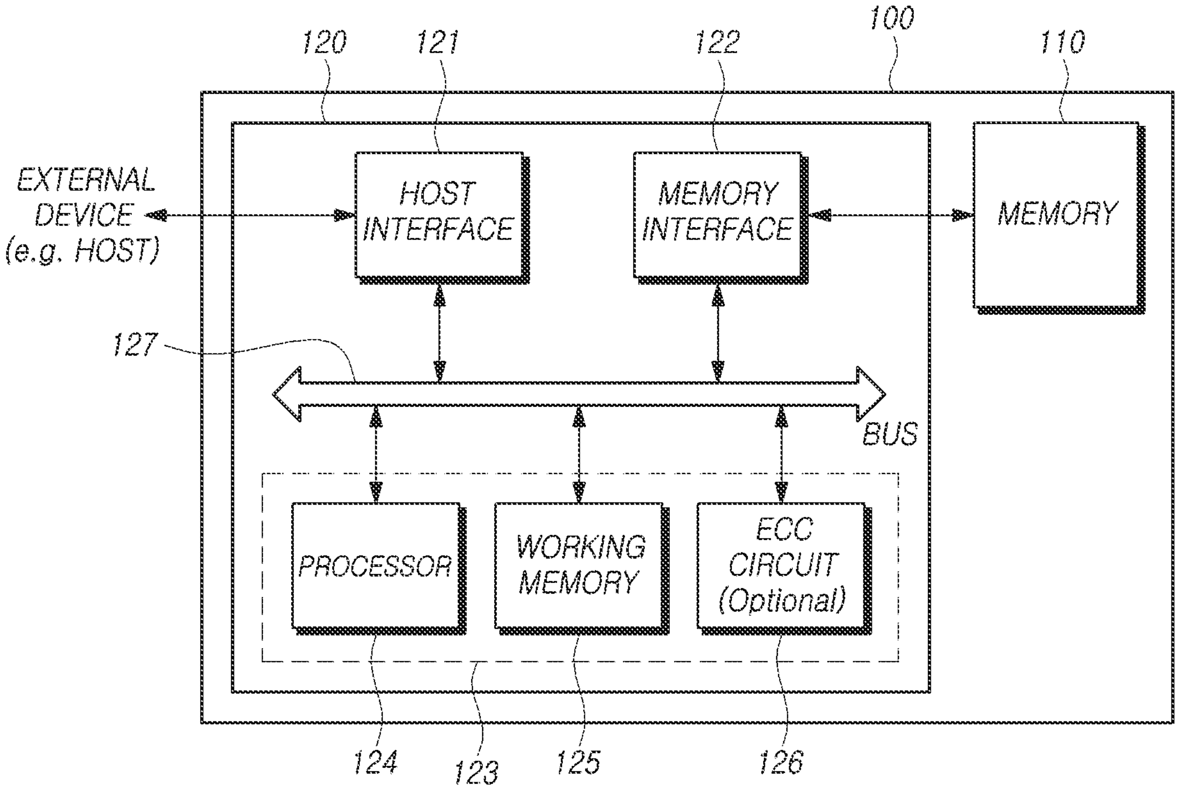
FIG. 1 is a schematic configuration diagram of a storage device according to an embodiment of the present disclosure.

Hereinafter, embodiments of the present disclosure are described in detail with reference to the accompanying drawings. Throughout this specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations and should not be construed as being limited to the embodiments set forth herein. Rather, the described embodiments are provided so that this disclosure will be thorough, complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation, or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, a wearable device, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, descriptions will describe the controller 120 and the host as devices that are separated from each other.

Referring to FIG. 1, the controller 120 may include a memory interface 122 and a control circuit 123 and may further include a host interface 121.

The host interface 121 provides an interface for communication with the host. For example, the host interface 121 provides an interface that uses at least one of various communication standards or protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121 and may perform an operation of processing the received command.

The memory interface 122 may be coupled with the memory 110 to provide an interface for communication with the memory 110. The memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125 and may optionally include an error detection and correction circuit (ECC circuit) 126.

The processor 124 may control general operations of the controller 120 and may perform a logic calculation. The processor 124 may communicate with the host through the host interface 121 and may communicate with the memory 110 through the memory interface 122.

The processor 124 may execute logical operations required to perform the function of a flash translation layer (FTL). The processor 124 may translate a logical block address (LBA) provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host by using a set randomizing seed. The randomized data may be provided to the memory 110 and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware, which is a program to be executed in the storage device 100 to drive the storage device 100, may include various functional layers. For example, the firmware may include binary data in which codes for executing the functional layers, respectively, are defined.

For example, the firmware may include at least one of a flash translation layer which performs a translating function between a logical address requested to the storage device 100 from the host and a physical address of the memory 110; a host interface layer (HIL) which serves to analyze a command requested to the storage device 100 as a storage device from the host and transfer the command to the flash translation layer; and a flash interface layer (FIL) which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, is data for managing the memory 110, and may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command, and data. The working memory 125 may be a volatile memory that includes, for example, at least one of an SRAM (static RAM), a DRAM (dynamic RAM) and an SDRAM (synchronous DRAM). The controller 120 may additionally use a separate volatile memory (e.g. SRAM, DRAM) located outside the controller 120 in addition to the working memory 125.

The error detection and correction circuit 126 may detect an error bit of target data and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER) and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
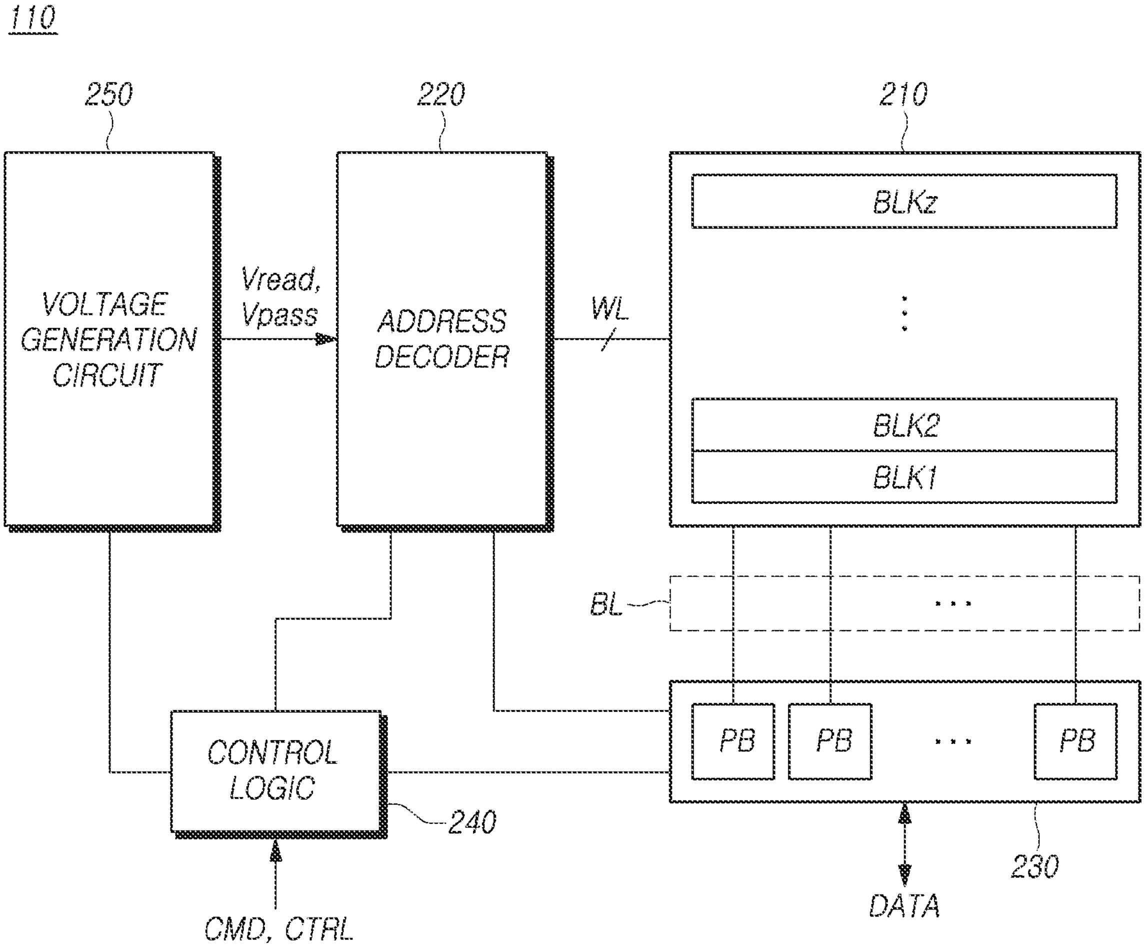
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation and may apply the pass voltage Vpass to the remaining unselected word lines WL.

The address decoder 220 may apply a verify voltage generated in the voltage generation circuit 250 to a selected word line WL in a selected memory block in a program verify operation and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210 and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 of two outermost word lines, and a second select line (also referred to as a drain select line or a source select line) may be additionally disposed outside a second outermost word line of the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
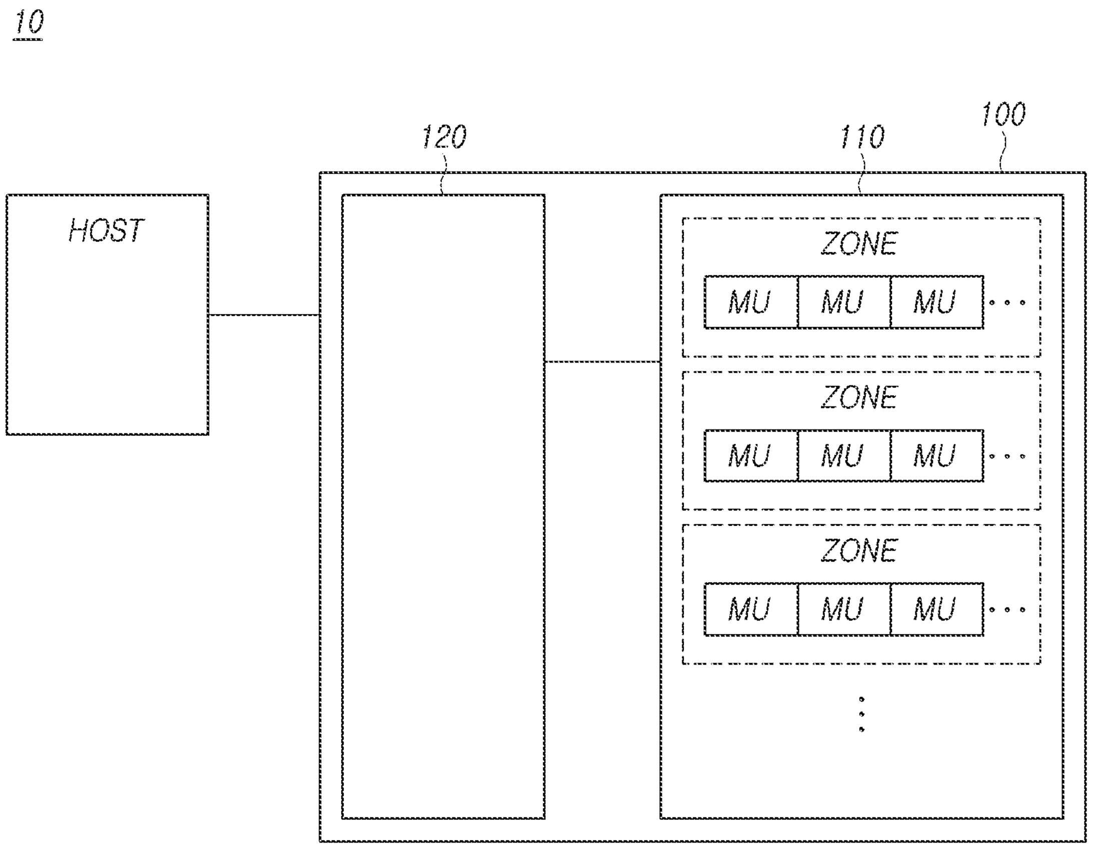
FIG. 3 is a diagram illustrating a schematic structure of a system based on an embodiment of the disclosed technology.

FIG. 3 is a diagram illustrating the schematic structure of a system 10 based on an embodiment of the disclosed technology.

Referring to FIG. 3, the system 10 may include a storage device 100 and a host HOST.

The storage device 100 may include a memory 110 and a controller 120.

The memory 110 may include a plurality of memory units MU. For example, each of the plurality of memory units MU may be configured by a memory block, a page, a super memory block being a logical set of a plurality of memory blocks or a super page being a logical set of a plurality of pages.

Each of the plurality of memory units MU may be mapped to one of a plurality of zones ZONE.

The host HOST may manage the plurality of zones ZONE. The host HOST may request, to the storage device 100, an operation of creating the plurality of zones ZONE, an operation of writing data to the plurality of zones ZONE, an operation of reading data from the plurality of zones ZONE and an operation of deleting or resetting some of the plurality of zones ZONE.

When writing data to one zone ZONE among the plurality of zones ZONE, the host HOST may sequentially write the data to the corresponding zone ZONE. In this case, data already stored in the corresponding zone ZONE is not changed. To this end, the host HOST may manage, for each of the plurality of zones ZONE, a write pointer which indicates a position where data is to be written in each zone ZONE.

To manage the plurality of zones ZONE, the host HOST may use zone information for each of the plurality of zones ZONE. Through the zone information for each of the plurality of zones ZONE, the host HOST may be aware of the states of the plurality of zones ZONE and may obtain the size of data stored in each of the plurality of zones ZONE and the size of data capable of being additionally stored in each of the plurality of zones ZONE.

The controller 120 may set the plurality of zones ZONE in the memory 110 according to a request of the host HOST.

The controller 120 may control a write operation on the memory 110 and may write data to one zone ZONE among the plurality of zones ZONE according to a request of the host HOST.

While the storage device 100 writes data according to a request of the host HOST, a sudden power-off, in which power supply is abnormally stopped, may occur. In this case, data write-requested by the host HOST may not be stored in the storage device 100 or may be abnormally stored in the storage device 100.

After power supply is restored, the storage device 100 may perform a recovery operation for the sudden power-off. Hereinafter, this will be described in detail.

Figure 4:
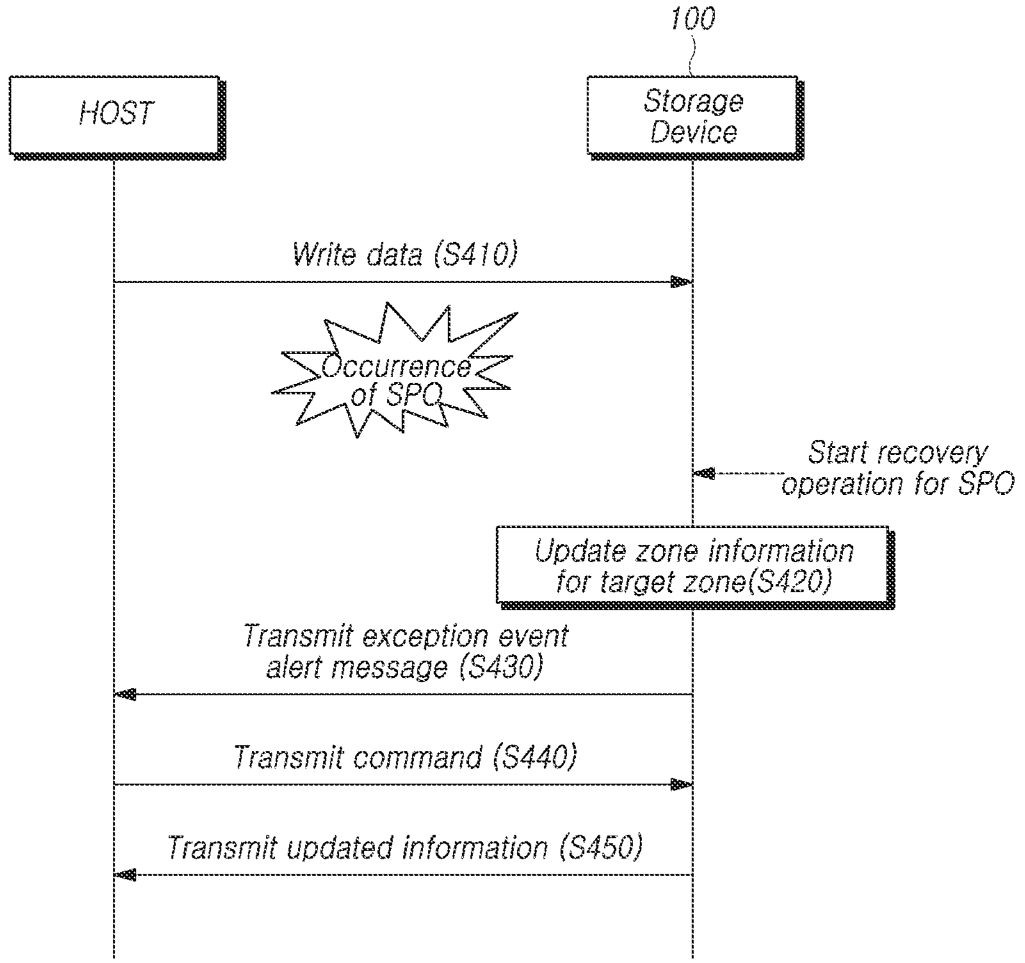
FIG. 4 is a sequence diagram illustrating an operation of the system based on the embodiment of the disclosed technology.

FIG. 4 is a sequence diagram illustrating the operation of the system 10 based on the embodiment of the disclosed technology.

Referring to FIG. 4, the host HOST may request the controller 120 of the storage device 100 to write data (S410). The host HOST may request to write data to a target zone ZONE among the plurality of zones ZONE.

While the controller 120 writes data according to the request of the HOST, a sudden power-off (SPO) may occur. The controller 120 may detect occurrence of the sudden power-off.

After the sudden power-off occurs, when power supply is restored, the storage device 100 may execute a recovery operation for the sudden power-off. When executing the recovery operation for the sudden power-off, the controller 120 may update zone information for the target zone ZONE among the plurality of zones ZONE described above (S420).

For example, the zone information for the target zone ZONE may include the state of the target zone ZONE and information related to memory units mapped to the target zone ZONE (e.g., whether each memory unit is a memory unit in which data is stored or a free memory unit).

To update the zone information for the target zone ZONE, the controller 120 may scan the target zone ZONE. For example, the controller 120 may update the zone information for the target zone ZONE while sequentially scanning the memory units included in the target zone ZONE from the start address to the end address of the target zone ZONE.

After updating the zone information for the target zone ZONE, the controller 120 may transmit an exception event alert message to the host HOST (S430). This is to alert the host HOST that the zone information for the target zone ZONE has been updated after the sudden power-off.

As described above, to manage the plurality of zones ZONE, the host HOST may use zone information for each of the plurality of zones ZONE. To this end, zone information used by the host HOST and the actual information of the plurality of zones ZONE set in the storage device 100 should be synchronized with each other.

However, when a sudden power-off occurs, inconsistency in zone information may occur between the host HOST and the storage device 100.

For example, when a sudden power-off occurs while data is written to the target zone ZONE among the plurality of zones ZONE, the host HOST may determine that the operation of writing the data to the target zone ZONE has been completed, but actually the data may not be written to the target zone ZONE. In this case, the data size of the target zone ZONE recognized by the host HOST and the actual data size of the target zone ZONE may be different from each other.

For another example, after a sudden power-off occurs, to ensure the stability and reliability of the target zone ZONE, the storage device 100 may write by itself dummy data to the target zone ZONE. However, the HOST may not be aware of whether dummy data is written to the target zone ZONE.

When inconsistency in zone information occurs between the host HOST and the storage device 100, an issue may be caused in that the size of a region capable of storing data in the plurality of zones ZONE decreases.

Therefore, to prevent such inconsistency, the controller 120 of the storage device 100 may alert the host HOST that zone information for the plurality of zones ZONE has been updated due to a sudden power-off, through the exception event alert message.

Through this, the host HOST may perform an operation of synchronizing zone information used by the host HOST and the actual information of the plurality of zones ZONE set in the storage device 100. As a result, even after a sudden power-off, the reliability of a read operation and a write operation for the plurality of zones ZONE may be ensured.

After the controller 120 transmits the exception event alert message to the host HOST, the host HOST may transmit a command to the controller 120 (S440). The host HOST may transmit the command to the controller 120 to obtain updated zone information.

When receiving the command from the host HOST, the controller 120 may transmit the zone information updated in the operation S420 to the host HOST as a response to the command (S450). The host HOST may accurately determine the current state of the target zone ZONE on the basis of the received zone information.

The controller 120 may additionally transmit zone information for zones ZONE other than the target zone ZONE among the plurality of zones ZONE to the host HOST. The controller 120 may also update zone information for the zones ZONE other than the target zone ZONE. The controller 120 may transmit the zone information for the zones ZONE other than the target zone ZONE to the host HOST together with the zone information for the target zone ZONE.

Hereinafter, specific embodiments of the operations of the host HOST and the storage device 100 described above with reference to FIG. 4 will be described. First, the target zone ZONE among the plurality of zones ZONE will be described.

Figure 5:
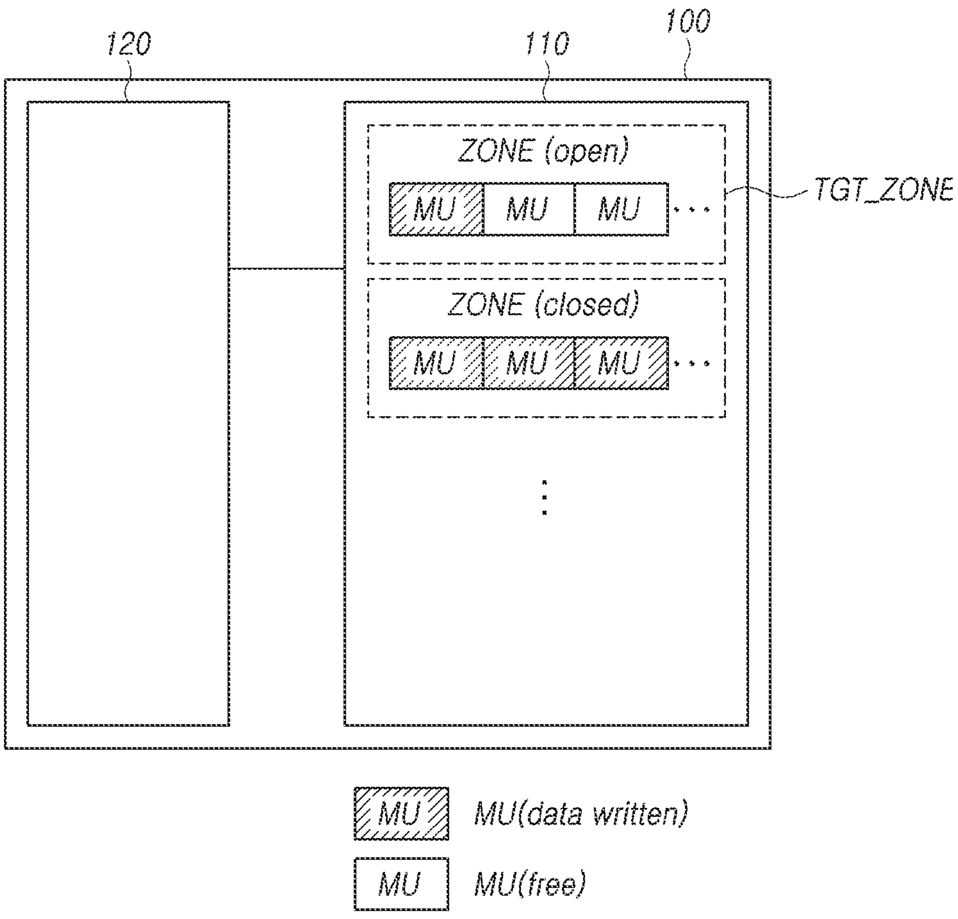
FIG. 5 is a diagram illustrating a target zone based on the embodiment of the disclosed technology.

FIG. 5 is a diagram illustrating a target zone TGT_ZONE based on an embodiment of the disclosed technology.

Referring to FIG. 5, one of the plurality of zones ZONE may be set as the target zone TGT_ZONE. The target zone TGT_ZONE may be an open zone which is in an open state.

When the target zone TGT_ZONE is in an open state, it is possible to additionally write new data to the target zone TGT_ZONE. All or some of the memory units included in the target zone TGT_ZONE may be free memory units in which data is not stored.

On the other hand, some zones ZONE among the plurality of zones ZONE may be in a closed state. It is impossible to additionally write data to a zone ZONE which is in a closed state. A free memory unit may not exist in a zone ZONE which is in a closed state.

The controller 120 of the storage device 100 may determine the state of the target zone TGT_ZONE which is an open zone ZONE, and may update zone information for the target zone TGT_ZONE on the basis of the state.

Figure 6:
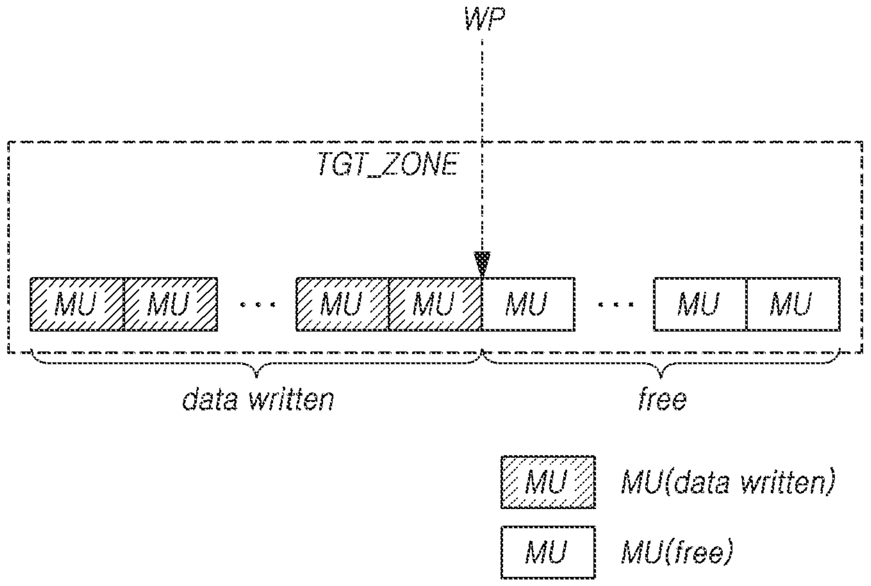
FIG. 6 is a diagram illustrating a state of a target zone based on the embodiment of the disclosed technology.

FIG. 6 is a diagram illustrating the state of the target zone TGT_ZONE based on the embodiment of the disclosed technology.

Referring to FIG. 6, the target zone TGT_ZONE is in an open state as described above.

Some of the memory units MU included in the target zone TGT_ZONE may be memory units MU in which data is already stored, and some of the memory units MU included in the target zone TGT_ZONE may be free memory units MU in which data is not stored. Since data is sequentially written to the target zone TGT_ZONE, the memory units MU in which data is already stored may be located in a front part of the target zone TGT_ZONE, and the free memory units MU may be located in a rear part of the target zone TGT_ZONE.

By scanning the target zone TGT_ZONE, the controller 120 may determine location information WP of a memory unit MU to which data is last written in the target zone TGT_ZONE. Since data is sequentially written in the target zone TGT_ZONE, memory units MU after the memory unit MU to which data is last written in the target zone TGT_ZONE are free memory units MU. The location information WP of a memory unit MU may be expressed by a write pointer which indicates the address of the memory unit MU.

Based on this, the controller 120 may update the zone information of the target zone TGT_ZONE.

For example, the zone information may include at least one of information of valid memory units included in the target zone TGT_ZONE, location information WP of a memory unit to which data is last written in the target zone TGT_ZONE, information of free memory units of the target zone TGT_ZONE and state information of the target zone TGT_ZONE.

Valid memory units included in the target zone TGT_ZONE may be memory units in which valid data accessible by the host HOST is stored. The information of valid memory units may indicate the number or size of the valid memory units. Memory units to which dummy data is written may be excluded from valid memory units.

The location information WP of a memory unit to which data is last written in the target zone TGT_ZONE may be used to determine the address of a memory unit to which new data to be written to the target zone TGT_ZONE is written.

The information of free memory units of the target zone TGT_ZONE may indicate the number or size of free memory units included in the target zone TGT_ZONE.

The state information of the target zone TGT_ZONE may indicate the state of the target zone TGT_ZONE. For example, the state of the target zone TGT_ZONE may be an open state, a closed state, an empty state, a full state, or the like.

The open state may be a state in which a write operation for the target zone TGT_ZONE is being executed or may be executed. The closed state may be a state in which a write operation for the target zone TGT_ZONE is stopped. The empty state is a state in which the target zone TGT_ZONE is erased, and may be a state in which a write operation for the target zone TGT_ZONE is not determined. The full state may be a state in which a write operation for the target zone TGT_ZONE is completed.

Figure 7:
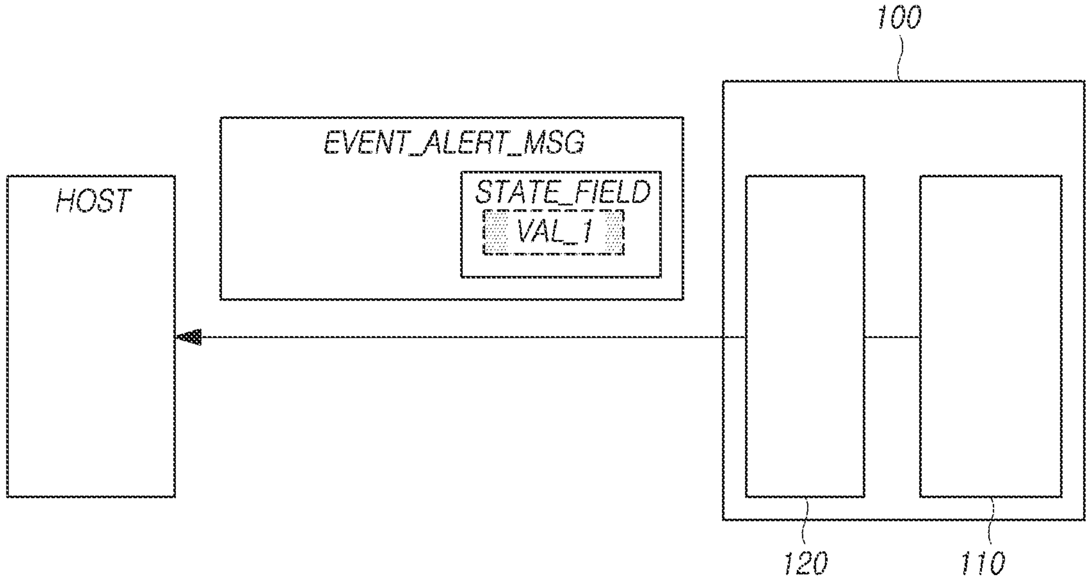
FIG. 7 is a diagram illustrating an operation in which a storage device based on the embodiment of the disclosed technology transmits an exception event alert message to a host.

FIG. 7 is a diagram illustrating an operation in which the storage device 100 based on the embodiment of the disclosed technology transmits an exception event alert message EVENT_ALERT_MSG to the host HOST.

As described above, after updating the zone information for the target zone TGT_ZONE, the controller 120 of the storage device 100 may transmit the exception event alert message EVENT_ALERT_MSG to the host HOST.

The exception event alert message EVENT_ALERT_MSG may be implemented in various forms. For example, the exception event alert message EVENT_ALERT_MSG may be a response UFS Protocol Information Unit (UPIU) message which is defined in the UFS specification.

To allow the host HOST to recognize that the corresponding response UPIU message is the exception event alert message EVENT_ALERT_MSG, a predefined specific bit (e.g., an event alert bit (EVENT_ALERT bit)) may be set in the corresponding response UPIU message.

When transmitting the exception event alert message EVENT_ALERT_MSG to the host HOST, the controller 120 may set an exception event state field STATE_FIELD included in the exception event alert message EVENT_ALERT_MSG to a first value VAL_1 (e.g., 0b11) indicating that the zone information for the target zone TGT_ZONE has been updated.

For example, when the exception event alert message EVENT_ALERT_MSG is implemented as the above-described response UPIU message, the exception event state field STATE_FIELD may be an exception event state (wExceptionEventState) field located at 0xOEh in the UFS query attribute information of the response UPIU message.

The controller 120 may additionally set the value of an exception event control (wExceptionEventControl) field located at 0x0Dh of the UFS query attribute information, to the first value VAL_1. On the other hand, the controller 120 may set the value of the exception event control (wExceptionEventControl) field to a value different from the first value VAL_1.

To alert the host HOST that the storage device 100 supports the exception event alert message EVENT_ALERT_MSG, the controller 120 may also additionally set the value of an extended UFS features support (dExtendedUFSFeaturesSupport) field located at 0x04Fh of the UFS query attribute information, to the first value VAL_1.

Figure 8:
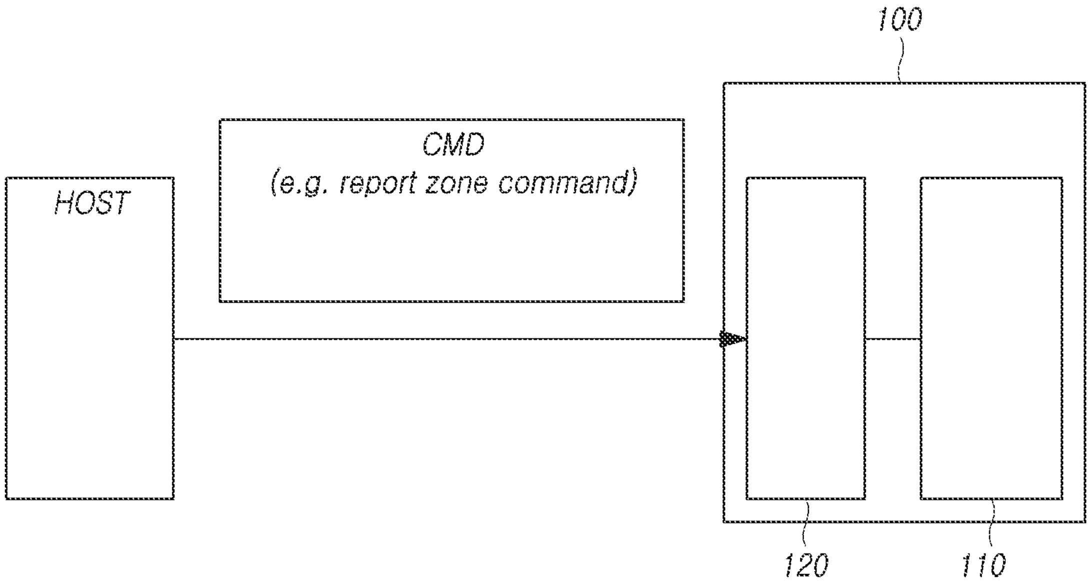
FIG. 8 is a diagram illustrating an operation in which the storage device based on the embodiment of the disclosed technology receives a command from the host.

FIG. 8 is a diagram illustrating an operation in which the storage device 100 based on the embodiment of the disclosed technology receives a command CMD from the host HOST.

As described above, after the storage device 100 transmits the exception event alert message EVENT_ALERT_MSG to the host HOST, the host HOST may transmit the command CMD to the storage device 100.

For example, the command CMD may be a report zone command which requests to report information for the plurality of zones ZONE.

For another example, the command CMD may be a read buffer command which requests to read a buffer set in the storage device 100.

Figure 9:
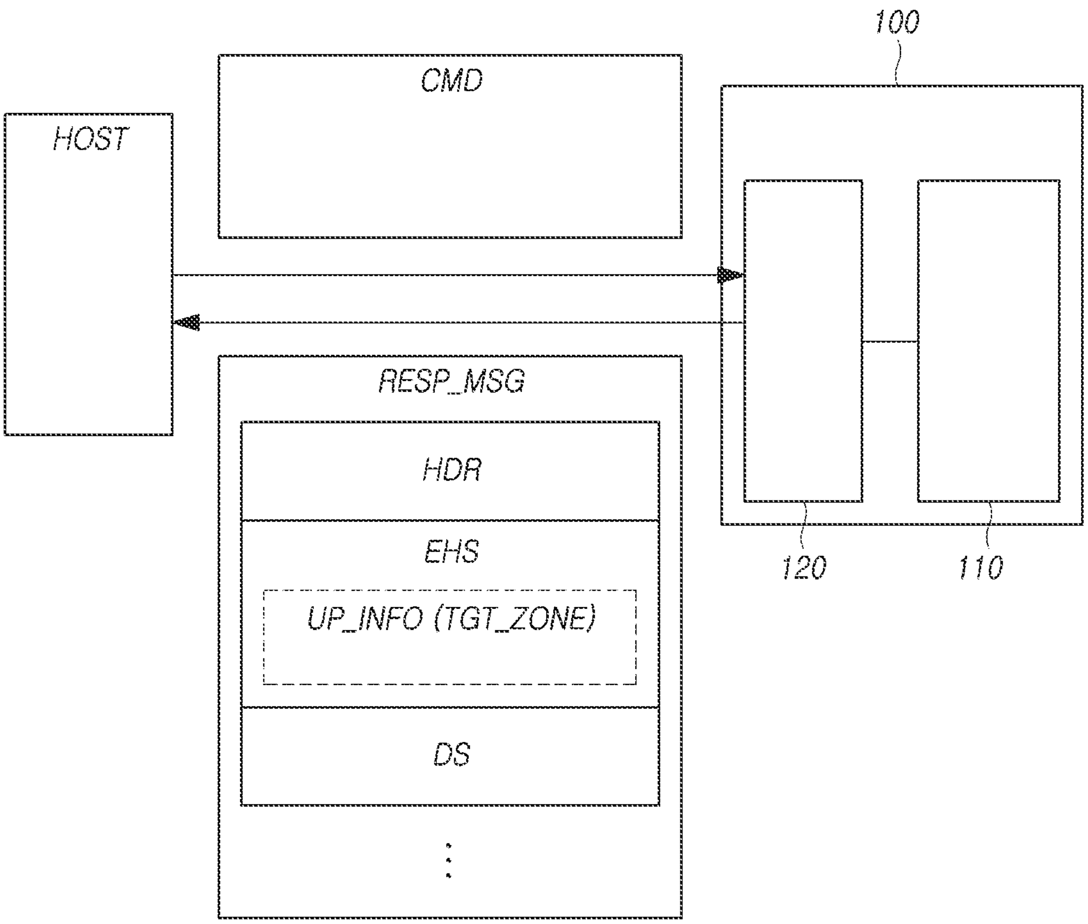
FIG. 9 is a diagram illustrating an operation in which the storage device based on the embodiment of the disclosed technology responds to the received command.

FIG. 9 is a diagram illustrating an operation in which the storage device 100 based on the embodiment of the disclosed technology responds to the received command CMD.

In FIG. 9, the controller 120 of the storage device 100 may transmit a response message RESP_MSG to the host HOST as a response to the command CMD received from the host HOST.

The controller 120 may add updated zone information UP_INFO to an extended header segment EHS of the response message RESP_MSG. As described above, the updated zone information UP_INFO may be the zone information for the target zone TGT_ZONE.

For example, the extended header segment EHS may be located between a header HDR and a data segment DS of the response message RESP_MSG and may be variable in size. The controller 120 may set information on the size of the extended header segment EHS in the header HDR of the response message RESP_MSG. In addition, the controller 120 may set, in the header HDR of the response message RESP_MSG, a flag indicating that the updated zone information UP_INFO is transmitted through the extended header segment EHS.

Figure 10:
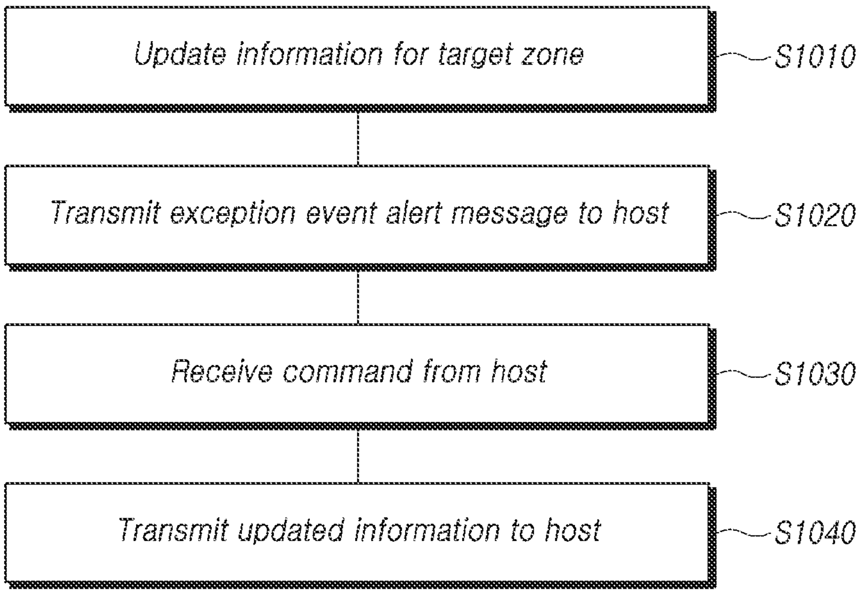
FIG. 10 is a diagram illustrating a method for operating a storage device based on an embodiment of the disclosed technology.

FIG. 10 is a diagram illustrating a method for operating the storage device 100 based on an embodiment of the disclosed technology.

The method for operating the storage device 100 may include operation S1010 of updating zone information for the target zone TGT_ZONE among the plurality of zones ZONE when executing a recovery operation for a sudden power-off. Each of the plurality of zones ZONE may include at least one of the plurality of memory units MU included in the memory 110.

For example, the target zone TGT_ZONE may be an open zone.

For example, the zone information for the target zone TGT_ZONE may include at least one of i) information of valid memory units included in the target zone TGT_ZONE, ii) location information of a memory unit to which data is last written in the target zone TGT_ZONE, iii) information of free memory units of the target zone TGT_ZONE, and iv) state information of the target zone TGT_ZONE.

The method for operating the storage device 100 may include operation S1020 of transmitting the exception event alert message EVENT_ALERT_MSG to the host HOST, after updating the zone information at the operation S1010.

For example, the operation S1020 may include an operation of setting, to the first value VAL_1 indicating that the above-described zone information has been updated, the exception event state field STATE_FIELD included in the exception event alert message EVENT_ALERT_MSG.

The method for operating the storage device 100 may include operation S1030 of receiving the command CMD from the host HOST, after transmitting the exception event alert message EVENT_ALERT_MSG at the operation S1020.

For example, the command CMD may be a report zone command which requests to report information for the plurality of zones ZONE.

The method for operating the storage device 100 may include operation S1040 of transmitting the zone information, which has been updated at the operation S1010, to the host HOST as a response to the command CMD received at the operation S1030.

For example, the operation S1040 may include i) an operation of adding the updated zone information UP_INFO to the extended header segment EHS of the response message RESP_MSG for the command CMD, and ii) an operation of transmitting the response message RESP_MSG to the host HOST as a response to the command CMD.

Although various embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of this disclosure is not limited by the embodiments and the accompanying drawings. The spirit and scope of this disclosure should be interpreted in connection with the appended claims and encompass all equivalents falling within the scope of the appended claims. Furthermore, the embodiments may be combined to form additional embodiments.

What is claimed is:

1. A storage device comprising:

a memory including a plurality of memory units, each of the plurality of memory units being mapped to one of a plurality of zones which are managed by a host; and a controller configured to:

update, when executing a recovery operation for a sudden power-off, zone information for a target zone among the plurality of zones, transmit, after updating the zone information, an exception event alert message to the host, receive, after transmitting the exception event alert message, a command from the host, and transmit the zone information to the host as a response to the command, wherein the exception event alert message is a response UFS Protocol Information Unit (UPIU) message which is defined in an UFS specification, wherein the controller sets values of an exception event state field, an exception event control field, and an extended UFS features support field in UFS query attribute information to a first value indicating that the zone information has been updated.

2. The storage device according to claim 1, wherein the target zone is an open zone.

3. The storage device according to claim 2, wherein the zone information further includes at least one of location information of a memory unit to which data is last written in the target zone, information of free memory units of the target zone, and state information of the target zone.

4. The storage device according to claim 1, wherein the command is a report zone command which requests to report information for the plurality of zones.

5. The storage device according to claim 4, wherein the controller transmits the zone information by:

adding the zone information to an extended header segment of a response message for the command, and transmitting the response message to the host as a response to the command.

6. The storage device according to claim 1, wherein the exception event alert message alerts the host that the zone information for the plurality of zones has been updated due to the sudden power-off, and the host performs an operation of synchronizing the zone information used by the host and actual information of the plurality of zones set in the storage device.

7. A method for operating a storage device, the method comprising:

updating, when executing a recovery operation for a sudden power-off, zone information for a target zone among a plurality of zones;

transmitting, after updating the zone information, an exception event alert message to a host which manages the plurality of zones;

receiving, after transmitting the exception event alert message, a command from the host; and transmitting the zone information to the host as a response to the command, wherein the exception event alert message is a response UFS Protocol Information Unit (UPIU) message which is defined in an UFS specification, wherein the transmitting the exception event alert message comprises setting values of an exception event state field, an exception event control field, and an extended UFS features support field in UFS query attribute information to a first value indicating that the zone information has been updated.

8. The method according to claim 7, wherein the target zone is an open zone.

9. The method according to claim 8, wherein the zone information includes at least one of information of valid memory units included in the target zone, location information of a memory unit to which data is last written in the target zone, information of free memory units of the target zone, and state information of the target zone.

10. The method according to claim 7, wherein the command is a report zone command which requests to report information for the plurality of zones.

11. The method according to claim 10, wherein the transmitting the zone information to the host comprises:

adding the zone information to an extended header segment of a response message for the command; and transmitting the response message to the host as a response to the command.

12. The method according to claim 7, wherein the exception event alert message alerts the host that the zone information for the plurality of zones has been updated due to the sudden power-off, and the host performs an operation of synchronizing the zone information used by the host and actual information of the plurality of zones set in the storage device.

13. A system comprising:

a host configured to manage a plurality of zones; and a storage device including a plurality of memory units, each of the plurality of memory units being mapped to one of the plurality of zones, wherein the storage device is configured to:

update, when executing a recovery operation for a sudden power-off, zone information for a target zone among the plurality of zones, transmit, after updating the zone information, an exception event alert message to the host, receive, after transmitting the exception event alert message, a command from the host, and transmit the zone information to the host in response to the command, wherein the exception event alert message is a response UFS Protocol Information Unit (UPIU) message which is defined in an UFS specification, wherein the storage device sets values of an exception event state field, an exception event control field, and an extended UFS features support field in UFS query attribute information to a first value indicating that the zone information has been updated.

14. The system of claim 13, wherein the exception event alert message alerts the host that the zone information for the plurality of zones has been updated due to the sudden power-off, and the host performs an operation of synchronizing the zone information used by the host and actual information of the plurality of zones set in the storage device.

* * * * *